United States Patent
Beltran et al.

(10) Patent No.: US 7,407,679 B2
(45) Date of Patent: Aug. 5, 2008

(54) USE OF CATIONIC PRESERVATIVE IN FOOD PRODUCTS

(75) Inventors: Joan Baptista Urgell Beltran, Barcelona (ES); Joan Seguer Bonaventura, L'Hospitalet de Llobregat/Barcelona (ES)

(73) Assignee: Laboratorios Miret, S.A., Barcelona (ES)

( * ) Notice: Subject to any disclaimer, the term of this patent is extended or adjusted under 35 U.S.C. 154(b) by 0 days.

(21) Appl. No.: 10/493,783

(22) PCT Filed: Oct. 25, 2001

(86) PCT No.: PCT/EP01/12358

§ 371 (c)(1), (2), (4) Date: Apr. 26, 2004

(87) PCT Pub. No.: WO03/034842

PCT Pub. Date: May 1, 2003

(65) Prior Publication Data

US 2004/0265443 A1     Dec. 30, 2004

(51) Int. Cl.
A21D 4/00 (2006.01)
A23L 3/3463 (2006.01)

(52) U.S. Cl. ................................ 426/335; 426/321

(58) Field of Classification Search ............... 426/335, 426/321
See application file for complete search history.

(56) References Cited

U.S. PATENT DOCUMENTS

| | | | |
|---|---|---|---|
| 3,825,560 A | 7/1974 | Saito et al. | |
| 4,389,489 A | 6/1983 | Preiss et al. | 435/280 |
| 5,336,515 A | 8/1994 | Murphy et al. | 426/573 |
| 5,681,802 A | 10/1997 | Fujiwara et al. | 510/130 |
| 5,780,658 A * | 7/1998 | Martinez-Pardo et al. | 554/51 |
| 6,068,867 A | 5/2000 | Nussinovitch et al. | 426/102 |
| 6,299,915 B1 | 10/2001 | Nussinovitch et al. | 426/89 |
| 7,074,447 B2 | 7/2006 | Bonaventura et al. | 426/321 |
| 2003/0049305 A1* | 3/2003 | Von Rymon Lipinski et al. | 424/439 |
| 2004/0122095 A1* | 6/2004 | Bonaventura et al. | 514/551 |
| 2004/0166082 A1* | 8/2004 | Urgell-Beltran et al. | 424/70.21 |
| 2004/0175350 A1 | 9/2004 | Urgell Beltran et al. | 424/70.27 |
| 2004/0265443 A1 | 12/2004 | Beltran et al. | 426/321 |
| 2005/0175747 A1 | 8/2005 | Seguer Bonaventura et al. | 426/323 |
| 2006/0003421 A1 | 1/2006 | Markussen et al. | 435/69.1 |

FOREIGN PATENT DOCUMENTS

| | | |
|---|---|---|
| DE | 12 26 745 | 10/1966 |
| EP | 0 485 616 | 5/1992 |
| EP | 0 500 332 | 8/1992 |
| EP | 0 749 960 | 12/1996 |
| FR | 2.143.557 | 2/1973 |
| GB | 1 352 420 | 5/1974 |
| JP | 48-17047 | 3/1973 |
| JP | 58039651 | 3/1983 |
| JP | 59164704 | 9/1984 |
| JP | 03291211 | 12/1991 |
| JP | 09188605 | 7/1997 |
| JP | 09255518 | 9/1997 |
| JP | 09286712 | 11/1997 |
| JP | 10045557 | 2/1998 |
| WO | 94/07377 | 4/1994 |
| WO | 94/19026 | 9/1994 |
| WO | 94/19027 | 9/1994 |
| WO | 96/21642 | 7/1996 |
| WO | 97/30964 | 8/1997 |
| WO | 01/49121 | 7/2001 |

OTHER PUBLICATIONS

Infante, M.R. et al. "A Comparative Study on Surface Active and Antimicrobial Properties of Some $N^{\alpha}$-Lauroyl-L$\alpha$, $\omega$Dibasic Aminoacids Derivatives." *Fettte, Seifen, Anstrichmittel*. 87.8 (1985): 309-313.

Database FSTA Online. International Food Information Service (IFIS). "Method for preserving beer." USSR Patent SU 988 266 1983.

Montes et al.; Evaluacion de la Actividad Antimicrobiana del Conservante Mirenat-N Frente A *Salmonella typhimurium* Sobre Pollo en Canal.

English Translation of Montes et al.; Evaluacion de la Actividad Antimicriobiana del Conservante Mirenat-N Frente A *Salmonella typhimurium* Sobre Pollo en Canal.

Chemical Abstracts Service, Columbus, Ohio, US; Garcia Dominguez, J. et al.: "Cationic Surfactants With Antimicrobial Activity" retrieved from STN Database Accession No. 107:79974, XP002196810, Abstract and ES 530 051 A (Consejo Superior De Investigaciones Cientificas, Spain) May 1, 1995.

(Continued)

Primary Examiner—Keith D. Hendricks
Assistant Examiner—Jyoti Chawla
(74) Attorney, Agent, or Firm—Renner, Otto, Boisselle & Sklar, LLP

(57) ABSTRACT

A novel use of cationic preservatives and preparations according to this novel use. A cationic preservative derived from lauric acid and arginine, in particular, the ethyl ester of the lauramide of the arginine monohydrochloride, hereafter named LAE, can be used for the protection against the growth of microorganisms. LAE and related compounds are particularly suitable to be used in the preservation of all perishable food products. The composition optionally comprises auxiliary components and excipients.

12 Claims, No Drawings

OTHER PUBLICATIONS

Chemical Abstracts Service, Columbus, Ohio, US; Garcia Dominguez, J. J. et al.: "N-alpha.-Acyl-L-alkylaminoguanidinic Acids and Their Salts as Surfactants With Antimicrobial Action" retrieved from STN Database Accession No. 99:122920, XP002196912, Abstract and ES 512 643 A (Asociacion De Investigacion De Detergentes, Spain) Feb. 16, 1983.

Infante et al., Surface Active Molecules: Preparation and Properties of Long Chain $N^{\alpha}$-Acyl-$_L$-$\alpha$-Amino-$\omega$-Guanidine Alkyl Acid Derivatives; International Journal of Cosmetic Science 6, 1984, pp. 275-282.

Infante et al., A Comparative Study on Surface Active and Antimicrobial Properties of Some $N^{\alpha}$-Lauroyl-L$\alpha$, $\omega$Dibasic Aminoacids Derivatives; Fette Seifen Anstrichmittel, No. 8, 1985, pp. 309-313.

Garcia Dominguez et al.; Monocapas de Algunos N-$\alpha$-Acil Aminoacidos Antimicrobianos en Soluciones de NaCl; Anales de Quimica, vol. 82, 1986, pp. 413-418.

Infante et al.; The Influence of Steric Configuration of Some N$\alpha$-Lauroyl Amino-Acid Derivatives on Their Antimicrobial Activity; Fette Seifen Anstrichmittel, 88, No. 3, 1986, pp. 108-110.

Molinero et al.; Synthesis and Properties of N$\alpha$-Lauroyl-L-Argine Dipeptides From Collagen; JAOCS, vol. 65, No. 6, 1988, 4 pages.

Vinardell et al.; Comparative Ocular Test of Lipopeptidic Surfactants; International Journal of Cosmetic Science 12, 1990, pp. 13-20.

Kunieda et al.; Reversed Vesicles From Biocompatible Surfactants, Advanced Materials, No. 4, 1992, pp. 291-293.

Infante et al.; Sintesis y Propiedades de Tensioactivos Cationicos Derivados de Arginina; Anales de Química, vol. 88, 1992, pp. 542-547.

Fördedal et al.; Lipoamino Acid Association in the System $N^{\alpha}$-Lauroyl-$_L$-Arginine Methyl Ester—1-Pentanol—Water as Studied by Dielectric Spectroscopy; Colloids and Surfaces A: Physiochemical and Engineering Aspects, 79, 1993, pp. 81-88.

Infante et al., Non-Conventional Surfactants From Amino Acids and Glycolipids: Structure, Preparation and Properties; Colloids and Surfaces A: Physicochemical and Engineering Aspects 123-124, 1997, pp. 49-70.

Moran et al.; Chemical Structure/Property Relationship in Single-Chain Arginine Surfactants; Langmuir 2001, 17, pp. 5071-5075.

* cited by examiner

USE OF CATIONIC PRESERVATIVE IN FOOD PRODUCTS

This application is a national phase of International Application No. PCT/EP01/12358 filed Oct. 25, 2001 and published in the English language.

This invention relates to a novel use of cationic preservatives and preparations according to this novel use.

Despite the food industry must avoid the use of preservative products by means of good manufacture practices as it is described in the national and international regulations, it is often necessary to warrant the needed storage capability of the produced food-stuff but never to hide defective effects of a manipulation or manufacture technique.

A cationic preservative derived from lauric acid and arginine, in particular, the ethyl ester of the lauramide of the arginine monohydrochloride, hereafter named LAE, could be used for the protection against the growth of the microorganisms. The chemical structure is described in the following formula:

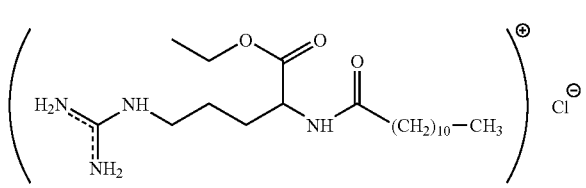

The preparation of this product has been described in Spanish patent application ES-A-512643.

Biological studies carried out at different research centres under supervision of the present applicant showed LAE to act mainly over the external and cytoplasmatic membrane of the microorganisms and, also, into the cytoplasmatic media, preventing their proliferation. Its action depends on the kind of microorganism and on the exposure time.

Besides, its metabolism in rats has been studied showing a fast absorption and metabolisation into naturally-occurring amino acids and the fatty acid lauric acid, which are eventually excreted as carbon dioxide and urea. Toxicological studies have demonstrated, that LAE is completely harmless to animals and humans.

Therefore, LAE and related compounds are particularly suitable to be used in the preservation of all perishable food products.

This compound is remarkable for its inhibitory action over the proliferation of different microorganisms, such as bacteria, fungi and yeasts. The minimum inhibitory concentrations of LAE are shown in the following table 1.

TABLE 1

| Kind | Microorganism | M.I.C. (ppm) |
| --- | --- | --- |
| Gram + Bacteria | *Arthrobacter oxydans* ATCC 8010 | 64 |
| | *Bacillus cereus* var mycoide ATCC 11778 | 32 |
| | *Bacillus subtilis* ATCC 6633 | 16 |
| | *Clostridium perfringens* ATCC 77454 | 16 |
| | *Listeria monocytogenes* ATCC 7644 | 10 |
| | *Staphylococcus aureus* ATCC 6538 | 32 |
| | *Micrococcus luteus* ATCC 9631 | 128 |
| | *Lactobacillus delbrueckii* ssp lactis CECT 372 | 16 |
| | *Leuconostoc mesenteroides* CETC 912 | 32 |
| Gram − Bacteria | *Alcaligenes faecalis* ATCC 8750 | 64 |
| | *Bordetella bronchiseptica* ATCC 4617 | 128 |
| | *Citrobacter freundii* ATCC 22636 | 64 |
| | *Enterobacter aerogenes* CECT 689 | 32 |
| | *Escherichia coli* ATCC 8739 | 32 |
| | *Escherichia coli* 0157H7 | 20 |
| | *Klebsiella pneumoniae* var pneumoniae CECT 178 | 32 |
| | *Proteus mirabilis* CECT 170 | 32 |
| | *Pseudomonas aeruginosa* ATCC 9027 | 64 |
| | *Salmonella typhimurium* ATCC16028 | 32 |
| | *Serratia marcenses* CECT 274 | 32 |
| | *Mycobacterium phlei* ATCC 41423 | 2 |
| Fungi | *Aspergillus niger* ATCC14604 | 32 |
| | *Aureobasidium pullulans* ATCC 9348 | 16 |
| | *Gliocadium virens* ATCC 4645 | 32 |
| | *Chaetonium globosum* ATCC 6205 | 16 |
| | *Penicillium chrysogenum* CECT 2802 | 128 |
| | *Penicillium funiculosum* CECT 2914 | 16 |
| Yeast | *Candida albicans* ATCC 10231 | 16 |
| | *Rhodotorula rubra* CECT 1158 | 16 |
| | *Saccharomyces cerevisiae* ATCC 9763 | 32 |

The use of the invention relates to cationic preservatives derived from the condensation of fatty acids and esterified dibasic amino acids, according to the following formula:

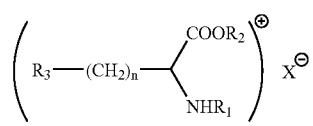

where:

$X^-$ is $Br^-$, $Cl^-$, or $HSO_4^-$ $R_1$: is a linear alkyl chain from a saturated fatty acid or hydroxyacid from 8 to 14 atoms of carbon bonded to the α-amino acid group through an amidic bond.

$R_2$: is a linear or branched alkyl chain from 1 to 18 carbon atoms or an aromatic group.

$R_3$: is:
—$NH_3$

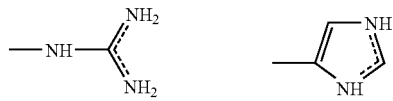

and n can be from 0 to 4.

The most preferred compound of the above class of compounds is LAE.

It is preferred to dissolve the compound directly before use in one of the following preferred solvents of food grade: water, ethanol, propylene glycol, isopropyl alcohol, other glycols, mixtures of glycols and mixtures of glycols and water. If the treatment shall be performed at a specific pH value the use of a corresponding buffer solution may be recommendable.

The composition optionally comprises auxiliary components and excipients. Such auxiliary components and excipients can be thickening agents (e.g. xanthan gum, guar gum, modified starches), anti-foam agents (e.g. dimethylpolysiloxane, silicon dioxide), products to obtain the optimal pH value (e.g. phosphates, tartrates, citrates, lactates), colouring agents (e.g. curcumin, tartrazine, erythrosine), and aroma products. It is preferred, that the preservative composition comprises LAE in an amount of from 0,0001% to 1% by weight relative to the whole weight of the preservative composition.

It is particularly preferred to use the inventive composition for the preservation of meat products, like for instance meat, poultry products, fish, crustaceans, vegetables, greens, emulsions, sauces, confectionery, bakery, pre-cooked meals, ready-to-serve meals, dairy products, egg-based products, jams, jellies, beverages, juices, wines and beers.

Moreover, the intended use relates to: wine-based flavoured drinks including products; non-alcoholic flavoured drinks; liquid tea concentrates and liquid fruit and herbal infusion concentrates; Barley Water; fruit and citric juices; Capilé Groselha; grape juices, unfermented, for sacramental use; wines, alcohol-free wines, fruit wines (including alcohol-free), alcoholic drinks with fruit; made wines, fruit sparkling wines, ciders, beers and perries (including alcohol-free); fermentation vinager; sod, saft; mead; spirits with less than 15% alcohol by volume; fillings of ravioli and similar products; quince, jams, jellies, marmelades and other fruit based spreads, candied, crystallized and glacé fruit and vegetables; sugar, glucose syrup, molasses and other sugars; transformed and dried fruits and vegetables, Frugtgrod and Rote Grütze, fruit and vegetable preparations (including fruit-based sauces); vegetable flesh; shell fruits; mousse, compote; salads, fruits and similar products, canned or bottled; Mostarda Di Fruta; Mascarpone; fruit based cake fillings; fruit gelling extracts and liquid pectine; vegetables and fruits in vinegar, brine or oil; rehydrated dried fruits; dressed dried fruits; sweetcorn canned in vacuum; potato dough and pre-fried, sliced, transformed, frozen, deep-frozen and peeled potatoes; dehydrated potato flakes and granulated (?); gnocchi; polenta; olives and olive-based preparations; jelly coating of meat products (cooked, cured or dried); burger meat; heat-treated meat products, sausages, breakfast sausages, pickled porks, pates, Foie Gras, Foie Gras Entier, Blocs de Foie Gras; Sagu; Mehu and Makeutettu; Ostkaka; Pasha; Semmelknodelteig; Polsebrod and bollery Dansk; canned Flutes; gelatine; collagen based covers with a water activity of more than 0.6; salted meats, cured placenta, dried meat products; semi-preserved fish products including fish roe products, pickling, salted, dried fish, shrimps, cooked, Crangon crangon and Crangon vulgaris cooked; fresh, cooked, frozen and deep-frozen crusteacean; cheese, pre-packed, sliced, unripened and cured cheese, processed cheese, layered cheese and cheese with added foodstuffs; superficial treatment of cheese, fruits and vegetables; cheese substitute, meat substitute, fish substitute, crusteacean substitute; non-heat-treated dairy-based desserts, curdled milk, semolina and tapioca based desserts; liquid egg (white, yolk or whole egg), dehydrated, concentrated, frozen and deep-frozen egg products; pre-packed and sliced bread and rye-bread; partially baked, pre-packed bakery wares intended for retail sale, fine bakery wares with a water activity of more than 0.65; low-energetic bread; dry-biscuits; cereal- or potato-based snacks and coated nuts; batters, confectionery, glucose syrup based confectionery, flour based confectionery with a water activity of more than 0.65, chewing gum; Christmas pudding, nougats and marzipans; clotted cream; toppings (syrups for pancakes, flavoured syrups for milkshakes and ice cream, similar products), fat emulsions, dressing salads, emulsified sauces, non-emulsified sauces; prepared salads, mustard, seasonings and condiments; liquid soups and broths; aspic, liquid dietary food supplements; pearl barley; dietetic foods intended for special medical purposes and starches; dietetic formulae for weight control intended to replace total daily food intake or an individual meal; and other food products where the use of preservatives became necessary and allowed by law.

The cationic preservative may be added to a final stage of the product to be preserved or it may be added to a initial stage which would have the advantage of treating the food product, whereby it may be added as dry product to the product to be preserved, or in the form of a solution or dispersion.

The food products according to the invention are prepared according to the techniques which are well known to a person skilled in the art.

Procedures to Determine the Microbiological Population and Preservative Effect

The determination of the microbiological population is carried out according to the ISO standards.

The samples are treated by dilution in buffer peptone with the appropriate neutralising agent of the preservative. The culture media used for counting the microorganisms are: Soya triptone agar (32-35° C., 48 hours) for the determination of mesophilic bacteria; Sabouraud agar with chloramfenicol (25° C., 3-5 days) for fungi and yeast; Violet red bile glucose agar (32-35° C., 24 hours) for enterobacteria; Soya triptone agar (17° C., 5 days) for psychrotrophic bacteria.

EXAMPLES

Different examples of food products and formulations are shown where the product has been assayed. These examples are a part of the preparations and formulations assayed.

Example 1

This example shows the use of LAE in semi-preserved codfish in oil (table 2). The sample LAE was added to the oil assayed at a concentration of 100 ppm and its microbiological evolution at 4° C. was compared against a control.

TABLE 2

| | | Time (days) | | | | |
|---|---|---|---|---|---|---|
| | | 0 | | 14 | | 43 |
| | | | | Microorganism | | |
| | | Aerobe Bacteria | Mould & yeast | Aerobe Bacteria | Mould & yeast | Aerobe Bacteria | Mould & yeast |
| Sample | Control (cfu/g) | $3.4 \cdot 10^3$ | $4.0 \cdot 10^2$ | $3.8 \cdot 10^5$ | $2.0 \cdot 10^4$ | $2.7 \cdot 10^8$ | $1.2 \cdot 10^7$ |
| | With LAE (cfu/g) | $7.6 \cdot 10^3$ | $3.0 \cdot 10^2$ | $1.0 \cdot 10^4$ | $5.4 \cdot 10^3$ | $8.5 \cdot 10^4$ | $8.2 \cdot 10^3$ |

Example 2

This example shows the use of IAE in a chicken product (table 3). The sample LAE was added to at a concentration of 150 ppm and the evolution of aerobe and psychrotrophic bacteria at 10° C. was compared against a control.

TABLE 3

| | | Time (days) | | | | |
|---|---|---|---|---|---|---|
| | | 0 | | 14 | | 43 |
| | | | | Microorganism | | |
| | | Aerobe Bacteria | Psychro. Bacteria | Aerobe Bacteria | Psychro. Bacteria | Aerobe Bacteria | Psychro. Bacteria |
| Sample | Control (cfu/g) | $3.1 \cdot 10^5$ | $2.4 \cdot 10^4$ | $9.8 \cdot 10^5$ | $6.5 \cdot 10^5$ | $7.5 \cdot 10^8$ | $4.2 \cdot 10^8$ |
| | With LAE (cfu/g) | $1.2 \cdot 10^5$ | $3.0 \cdot 10^4$ | $4.2 \cdot 10^5$ | $7.1 \cdot 10^4$ | $6.1 \cdot 10^5$ | $6.8 \cdot 10^4$ |

Example 3

This example shows the use of LAE in a carbonated orange beverage (table 4). The sample LAE was added to at a concentration of 100 ppm and its micobiological evolution at 17° C. was compared against a control.

TABLE 4

| | | Time (days) | | | |
|---|---|---|---|---|---|
| | | 0 | | 14 | |
| | | | | Microorganism | |
| | | Aerobe Bacteria | Mould & yeast | Aerobe Bacteria | Mould & yeast |
| Sample | Control (cfu/g) | $4.0 \cdot 10^2$ | <10 | $6.5 \cdot 10^4$ | $1.7 \cdot 10^3$ |
| | With LAE (cfu/g) | $4.3 \cdot 10^2$ | <10 | $1.0 \cdot 10^2$ | <10 |

Example 4

This example shows the use of LAE in a blackberry juice (table 5). The sample LAE was added to at a concentration of 60 ppm and its micobiological evolution at 34° C. was compared against a control.

TABLE 5

| | | Time (days) | | | |
|---|---|---|---|---|---|
| | | 0 | | 14 | |
| | | | | Microorganism | |
| | | Aerobe Bacteria | Mould & yeast | Aerobe Bacteria | Mould & yeast |
| Sample | Control (cfu/g) | $5.1 \cdot 10^2$ | <10 | $2.5 \cdot 10^5$ | $3.7 \cdot 10^4$ |
| | With LAE (cfu/g) | $4.0 \cdot 10^2$ | <10 | $2.4 \cdot 10^3$ | <10 |

Example 5

This example shows the use of LAE in custard (table 6). The sample LAE was added to at a concentration of 100 ppm and its micobiological evolution at 25° C. was compared against a control.

TABLE 6

| | | Time (days) | | | |
|---|---|---|---|---|---|
| | | 0 | | 5 | |
| | | | | Microorganism | |
| | | Aerobe Bacteria | Anaerobe Bacteria | Aerobe Bacteria | Anaerobe Bacteria |
| Sample | Control (cfu/g) | <10 | <10 | $9.1 \cdot 10^7$ | $3.4 \cdot 10^7$ |
| | With LAE (cfu/g) | <10 | <10 | $1.1 \cdot 10^3$ | $4.1 \cdot 10^2$ |

Example 6

This example shows the use of LAE in fairy cakes (table 7). The sample LAE was added to at a concentration of 80 ppm and its microbiological evolution at 25° C. was compared against a control.

TABLE 7

|  |  | Time (months) | | | |
| --- | --- | --- | --- | --- | --- |
|  |  | 0 | | 3 | |
|  |  | Microorganism | | | |
|  |  | Aerobe Bacteria | Mould & yeast | Aerobe Bacteria | Mould & yeast |
| Sample | Control (cfu/g) | <10 | <10 | $9.1 \cdot 10^4$ | $3.4 \cdot 10^3$ |
|  | With LAE (cfu/g) | <10 | <10 | $1.1 \cdot 10^2$ | <10 |

Example 7

This example shows the use of LAE in veal stew (table 8). The sample LAE was added to at a concentration of 100 ppm and its microbiological evolution at 10° C. was compared against a control.

TABLE 8

|  |  | Time (days) | | | | | |
| --- | --- | --- | --- | --- | --- | --- | --- |
|  |  | 0 | | | 14 | | |
|  |  | Microorganism | | | | | |
|  |  | Aerobe Bacteria | Mould & yeast | Entero-bacteria | Aerobe Bacteria | Mould & yeast | Entero-bacteria |
| Sample | Control (cfu/g) | <10 | <10 | <10 | $9.1 \cdot 10^4$ | $3.4 \cdot 10^3$ | $1.1 \cdot 10^2$ |
|  | With LAE (cfu/g) | <10 | <10 | <10 | <10 | <10 | <10 |

Example 8

This example shows the use of LAE in ketchup (table 9). The sample LAE was added to at a concentration of 100 ppm and its microbiological evolution at 25° C. was compared against a control.

TABLE 9

|  |  | Time (days) | | | | | |
| --- | --- | --- | --- | --- | --- | --- | --- |
|  |  | 0 | | | 14 | | |
|  |  | Microorganism | | | | | |
|  |  | Aerobe Bacteria | Mould & yeast | Entero-bacteria | Aerobe Bacteria | Mould & yeast | Entero-bacteria |
| Sample | Control (cfu/g) | <10 | <10 | <10 | $1.2 \cdot 10^6$ | $4.3 \cdot 10^2$ | $1.4 \cdot 10^3$ |
|  | With LAE (cfu/g) | <10 | <10 | <10 | $2.2 \cdot 10^3$ | $1.4 \cdot 10^1$ | <10 |

The invention claimed is:

1. A food product containing a cationic preservative which is the ethyl ester of lauramide of arginine hydrochloride, derived from the condensation of fatty acids and esterified dibasic amino acids, said ethyl ester of lauramide of arginine hydrochloride having the following formula:

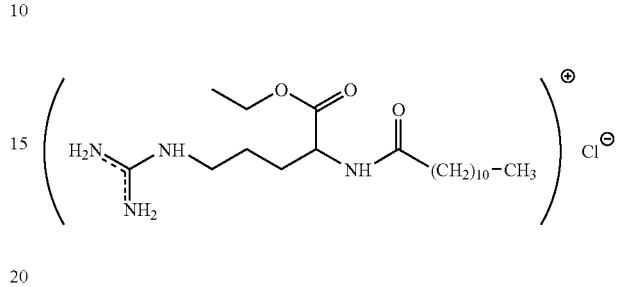

wherein said cationic preservative is present in the food product in an amount from about 0.006% to about 0.015% by weight.

2. The food product according to claim 1, wherein said cationic preservative is present in the food product in an amount from 0.008% to 0.015% by weight.

3. A method of preservation of a food product comprising the step of adding a cationic preservative which is the ethyl ester of lauramide of arginine hydrochloride, derived from the condensation of fatty acids and esterified dibasic amino acids, said ethyl ester of lauramide of arginine hydrochloride having the following formula:

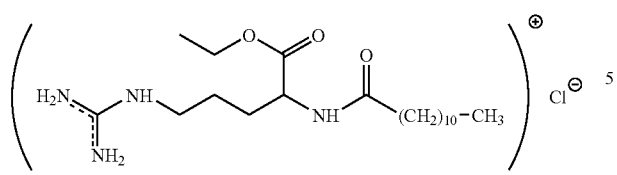

wherein said cationic preservative is added to the food product as a solution, dispersion or solid before, during and/or after the manufacture of the food product at a concentration of from about 0.006% to about 0.015% by weight.

4. The method of claim 3 wherein the food product comprises fish, crustaceans, fish substitutes or crustacean substitutes.

5. The method of claim 3 wherein the food product comprises meat, meat substitutes or poultry products.

6. The method of claim 3 wherein the food product comprises vegetables, greens, sauces or emulsions.

7. The method of claim 3 wherein the food product comprises beverages, juices, wines or beers.

8. The method of claim 3 wherein the food product comprises dairy, egg-based, jam, jelly, bakery or confectionary products.

9. The method of claim 3 wherein the food product comprises pre-cooked meal or ready-to-serve meal products.

10. The method according to claim 3, wherein said ethyl ester of lauramide of arginine hydrochloride is added to the food product to provide a concentration of from 0.008% to 0.015% by weight.

11. A method of preservation of food products, wherein a cationic preservative which is the ethyl ester of lauramide of arginine hydrochloride, derived from the condensation of fatty acids and esterified dibasic amino acids, said ethyl ester of lauramide of arginine hydrochloride having the following formula:

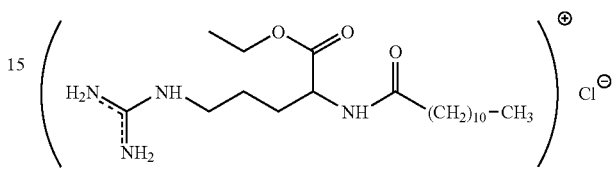

wherein said cationic preservative is applied by surface treatment before, during and/or after the manufacture of the food product at a concentration of from about 0.006% to about 0.015% by weight.

12. A method according to claim 11, wherein the cationic preservative is applied by spraying.

* * * * *